United States Patent
Radetzki et al.

(10) Patent No.: US 11,514,392 B2
(45) Date of Patent: Nov. 29, 2022

(54) ENERGY-EFFICIENT DELIVERY OF SHIPMENTS

(71) Applicants: Uwe Radetzki, Bonn (DE); Sandra Drees, Königswinter (DE); Heike Bischoff, Cologne (DE); Boris Trendafilov, Sankt Augustin (DE); Dong Uck Kong, Bonn (DE)

(72) Inventors: Uwe Radetzki, Bonn (DE); Sandra Drees, Königswinter (DE); Heike Bischoff, Cologne (DE); Boris Trendafilov, Sankt Augustin (DE); Dong Uck Kong, Bonn (DE)

(73) Assignee: Deutsche Post AG, Bonn (DE)

( * ) Notice: Subject to any disclaimer, the term of this patent is extended or adjusted under 35 U.S.C. 154(b) by 66 days.

(21) Appl. No.: 16/164,317

(22) Filed: Oct. 18, 2018

(65) Prior Publication Data

US 2019/0114588 A1  Apr. 18, 2019
US 2019/0295035 A2  Sep. 26, 2019

(30) Foreign Application Priority Data

Oct. 18, 2017  (DE) .................... 10 2017 124 340.2

(51) Int. Cl.
*G06Q 10/08* (2012.01)
*G05D 1/02* (2020.01)

(52) U.S. Cl.
CPC ..... *G06Q 10/08355* (2013.01); *G05D 1/0217* (2013.01)

(58) Field of Classification Search
CPC ............. G06Q 10/083; G06Q 10/0833; G06Q 10/0835; G06Q 10/0836; G06Q 10/0837

(Continued)

(56) References Cited

U.S. PATENT DOCUMENTS 10,663,529 B1 * 5/2020 Bolotski .............. G01R 31/378
2015/0278759 A1  10/2015 Harris et al.
(Continued)

FOREIGN PATENT DOCUMENTS

CN          102187178 A        9/2011

OTHER PUBLICATIONS

Russel et. al. ("A Genetic Algorithm for Unmanned Aerial Vehicle Routing", GECCO '05: Proceedings of the 7th annual conference on Genetic and evolutionary computation, Jun. 2005 1523-1530 available at: https://doi.org/10.1145/1068009.1068249; (Year: 2005).*

(Continued)

*Primary Examiner* — Emmett K. Walsh
(74) *Attorney, Agent, or Firm* — Reinhart Boerner Van Deuren P.C.

(57) ABSTRACT

In a method, historic delivery information is kept, which is associated with multiple deliveries of shipments, and the historic delivery information for each of the deliveries of shipments associated with the delivery information represents details pertaining to a delivery route, pertaining to an energy requirement, and pertaining to a vehicle configuration. In the method, shipment delivery information is obtained for multiple shipments to be delivered. The shipment delivery information represents a detail pertaining to the delivery position for the delivery of the respective shipment. A delivery route for delivering the shipments and a vehicle configuration is determined based on the shipment delivery information and the historical delivery information. In particular, the expected energy requirement for the delivery of the shipments is determined. Delivery control information is provided in order to cause delivery of the shipments along the determined delivery route by a vehicle having the determined vehicle configuration.

22 Claims, 5 Drawing Sheets

(58) Field of Classification Search
USPC .......................................................... 705/338
See application file for complete search history.

(56) References Cited

U.S. PATENT DOCUMENTS

| | | | | |
|---|---|---|---|---|
| 2015/0379874 | A1* | 12/2015 | Ubhi | G05D 1/101 |
| | | | | 701/3 |
| 2016/0111006 | A1* | 4/2016 | Srivastava | G08G 5/0026 |
| | | | | 701/3 |
| 2016/0232794 | A1* | 8/2016 | Hafeez | G08G 5/0043 |
| 2017/0286892 | A1* | 10/2017 | Studnicka | G06Q 20/401 |
| 2018/0016027 | A1* | 1/2018 | Cheatham, III | G06Q 10/0832 |

OTHER PUBLICATIONS

Bekhti, Mustapha and Achir, Nadjib and Boussetta, Khaled and Abdennebi, Marwen (2017) Drone Package Delivery: A Heuristic approach for UAVs path planning and tracking. EAI Endorsed Transactions on Internet of Things, 3 (9): 1. ISSN 2414-1399 (Year: 2017).*

Anonymous, "Don't Estimate . . . Calculate!," Jun. 1, 2016, 5 pages, DHL.

Eugene Y. C. Wong et al., "Supply Chain Decarbonisation in Shipping and Logistics Transportation," Jan. 1, 2013, 5 pages, vol. 1, No. 2, Journal of Traffic and Logistics, Engineering and Technology Publishing.

Dominik Karbowski et al., "Energy Consumption Prediction of a Vehicle along a User-Specified Real-World Trip," EVS26, Jan. 1, 2012, 12 pages, Los Angeles, California.

Deutsche Post AG, DHL, "Carbon Calculator Know Your Footprint," Jun. 2016, 2 pages, Bonn, Germany http://www.dhl.com/content/dam/downloads/gO/about_ us/green_ solutions/fly☐r dhl_ car boncalculator.PDF.

Wikipedia, "Machine Learning," Sep. 13, 2017, 17 pages https://en.wikipedia.org/w/index.php?title= Machine learning&oldid= 800425839.

Hornung et al., "OctoMap: An efficient probabilistic 3D mapping framework based on octrees" Autonomous Robots, 2013, pp. 189-206 (18 pages), Springer, Freiburg, Germany.

* cited by examiner

ENERGY-EFFICIENT DELIVERY OF SHIPMENTS

CROSS-REFERENCE TO RELATED PATENT APPLICATION

This patent application claims priority to German Application No. 10 2017 124 340.2, filed Oct. 18, 2017, the entire teachings and disclosure of which are incorporated herein by reference thereto.

FIELD

Exemplary embodiments of the invention relate to the energy-efficient delivery of shipments.

BACKGROUND

Methods for route planning for a delivery of shipments are known in the prior art. These route plannings are based on a route planning algorithm, for example, such as an algorithm for solving what is known as the commercial traveller problem. In this context, the route planning can take into consideration particular predetermined route criteria such as "energy-efficient" route. However, the energy efficiency of a delivery route obtained for an "energy-efficient" route as the result of such route planning is frequently unsatisfactory.

SUMMARY OF A FEW EXEMPLARY EMBODIMENTS OF THE INVENTION

The present invention has thus addressed the problem, inter alia, of improving the methods for route planning known in the prior art and providing a method, an apparatus, a system and a computer program that allow more energy-efficient delivery of shipments.

According to one exemplary aspect of the invention, a method performed by an apparatus or a system is disclosed, wherein the method comprises the following steps:

obtaining and/or keeping historic delivery information, wherein the historic delivery information is associated with multiple deliveries of shipments performed by one or various vehicle(s), and wherein the historic delivery information for each of the deliveries of shipments associated with the delivery information represents at least details pertaining to a delivery route, pertaining to an energy requirement and pertaining to a vehicle configuration, obtaining shipment delivery information for multiple shipments to be delivered, wherein the shipment delivery information at least for each of the shipments represents a detail pertaining to the delivery position for the delivery of the respective shipment, determining a delivery route for delivering the shipments and a vehicle configuration for a vehicle for delivering the shipments along the determined delivery route at least partially based on the shipment delivery information and the historical delivery information, wherein the determining of the delivery route and of the vehicle configuration comprises the determining of the expected energy requirement for the delivery of the shipments along the determined delivery route by a vehicle having the determined vehicle configuration, providing delivery control information in order to cause delivery of the shipments along the determined delivery route by a vehicle having the determined vehicle configuration.

The apparatus and/or the system are consistent, by way of example, with the apparatus disclosed below and/or the system disclosed below.

According to a further exemplary aspect of the invention, an apparatus or a system is further disclosed, wherein the apparatus or the system comprises means configured for performing the disclosed method or respective means for performing the steps of the disclosed method.

In this context, different steps can be performed at least partially by different means (e.g. components) and/or at least partially by the same means (e.g. components).

For example, the disclosed apparatus is an apparatus of a delivery service (e.g. an (e.g. central) apparatus for at least partially controlling deliveries to be made by vehicles of the delivery service, and/or delivery orders of the delivery service) and/or the disclosed system is a system of a delivery service (e.g. a system for at least partially controlling deliveries to be made by vehicles of the delivery service, and/or delivery orders of the delivery service). A delivery service is a postal and/or parcel service, for example.

The disclosed apparatus is, by way of example, a server apparatus (e.g. a (e.g. central) server apparatus of a delivery service for at least partially controlling deliveries to be made by vehicles of the delivery service, and/or delivery orders of the delivery service). Alternatively, the disclosed apparatus may also be, by way of example, part of a vehicle, for example the disclosed apparatus may be a control apparatus and/or part of a control apparatus of a vehicle (e.g. a vehicle of a delivery service).

The disclosed system comprises, by way of example, different apparatuses, with each of the apparatuses comprising one or more of the means. The different apparatuses may be, by way of example, different server apparatuses of a server cloud (e.g. of a (e.g. central) server cloud of a delivery service for at least partially controlling deliveries to be made by vehicles of the delivery service, and/or delivery orders of the delivery service). Alternatively, the system can also comprise just one apparatus (e.g. the disclosed apparatus).

The means of an apparatus (e.g. of the disclosed apparatus) and/or of a system (e.g. of the disclosed system) can comprise hardware and/or software components. The means can comprise, by way of example, at least one memory having program instructions of a computer program (e.g. of the computer program disclosed below) and at least one processor configured for executing program instructions from the at least one memory. Accordingly, an apparatus comprising at least one processor and at least one memory having program instructions is also intended to be understood as disclosed according to the invention, the at least one memory and the program instructions being configured so as, together with the at least one processor, to cause an apparatus to perform and/or control a disclosed method.

For example, the disclosed apparatus or the disclosed system comprises communication means. By way of example, these communication means are configured to communicate with an (e.g. remote) apparatus indirectly (e.g. via further communication means) and/or directly and to send and/or receive information (e.g. the shipment delivery information and/or the delivery control information).

Alternatively or additionally, the means of the apparatus or of the system can comprise one or more capture means. It goes without saying that the apparatus or the system can also comprise other means (e.g. components) not listed.

According to a further exemplary aspect of the invention, a computer program is further disclosed, wherein the computer program comprises program instructions configured so as, on execution by at least one processor, to cause an apparatus or a system (e.g. the disclosed apparatus or the disclosed system) to perform the disclosed method.

The disclosed computer program may be distributable, by way of example, via a network such as the Internet, a telephone or mobile radio network and/or a local area network. The disclosed computer program may at least partially be software and/or firmware of a processor. It may equally at least partially be implemented as hardware. The disclosed computer program may be stored, by way of example, on a computer-readable storage medium, e.g. a contactable, magnetic, electrical, electromagnetic, optical and/or other kind of storage medium. The storage medium may be, by way of example, part of a processor, for example a (non-volatile or volatile) program memory and/or main memory of a processor or a part thereof.

The disclosed method, the disclosed apparatus, the disclosed system and the disclosed computer program are, by way of example, for the energy-efficient control of a delivery of shipments.

The properties of the disclosed method, the disclosed apparatus, the disclosed system and the disclosed computer program are described—in part by way of example—below.

A shipment is, by way of example, a package, a packaged item, a parcel shipment and/or a mail shipment. It goes without saying that a shipment can comprise or may be formed by a liquid, a gas or loose material.

A delivery of a shipment in the present case is intended to be understood to mean the transport of the shipment by a vehicle along a delivery route to a delivery position for the delivery of the shipment, for example. Thus, the delivery of shipments (i.e. multiple shipments) in the present case is intended to be understood to mean the transport of each of the shipments by a vehicle along a delivery route to a respective delivery position for the delivery of the respective shipment, for example. Accordingly, a vehicle making such a delivery of shipments moves along the delivery route. At the respective delivery position, the respective shipment is provided for example by the vehicle or a delivery agent for collection and/or receipt by the recipient of the shipment (e.g. stored in a receiving compartment of a receiving apparatus such as a letterbox and/or parcel box).

A vehicle making such a delivery of shipments is, by way of example, an appropriately configured autonomous and/or semiautonomous land vehicle (e.g. a bicycle, a tricycle, a pedelec, a car, a heavy goods vehicle, a rail vehicle, such as a locomotive, an unmanned land vehicle and/or a robot), watercraft (e.g. a ship such as a cargo ship, a submarine and/or an unmanned watercraft) and/or aircraft (e.g. an aeroplane, a helicopter, an unmanned aircraft such as an aerial drone). An autonomous and/or semiautonomous vehicle is intended to be understood to mean, by way of example, a vehicle configured to move autonomously and/or at least partially autonomously. A vehicle is intended to be understood, by way of example, as at least partially autonomously moving if the vehicle moves (e.g. travels and/or flies and/or floats) at least over a section of a predetermined route (e.g. a delivery route), and navigates along the predetermined route, independently (e.g. without the influence of a vehicle driver). An autonomously moving vehicle moves over the entire route independently (e.g. without the influence of a vehicle driver) and navigates along the entire route independently, for example. In this context, an at least partially autonomously moving vehicle can move and/or navigate along the predetermined route independently of a user or of other apparatuses (e.g. one or more server apparatuses), or an at least partially autonomously moving vehicle can move and/or navigate along the predetermined route at least partially depending on a user or other apparatuses, e.g. it can obtain (e.g. from the user by means of an appropriate user input or from the other apparatuses) information (e.g. navigation information and/or control information for moving and/or navigating along the predetermined route). A semiautonomous and/or autonomous vehicle of this kind is an unmanned vehicle, for example.

In this context, a route such as a delivery route is intended to be understood to mean a path description for a path between multiple positions (e.g. delivery positions), for example. The path for the most part is not consistent with the line as the crow flies or the line of sight between these positions, but rather runs for example along transport routes such as inland transport routes (e.g. roads, footpaths, railways), water transport routes (e.g. waterways such as navigable rivers and canals) and/or air transport routes (e.g. air routes). A route can be represented by an orderly list of waypoint details, for example, each waypoint detail representing a position of a waypoint on a path at which the direction of the path changes, for example.

The trait that the historical delivery information is associated with multiple deliveries of shipments made by one or various vehicle(s) (i.e. deliveries made in the past) is intended to be understood, by way of example, such that the historical delivery information for each of the deliveries of shipments associated with the delivery information represents one or more details characteristic of the respective delivery of shipments. Such a detail characteristic of a delivery of shipments represents, by way of example, a parameter capturable (e.g. captured) and/or determinable (e.g. determined) by the respective vehicle that has made the respective delivery during the respective delivery, such as the energy requirement of the respective vehicle. In this context, an energy requirement is intended to be understood to mean, by way of example, an absolute energy requirement (e.g. an energy requirement in kilowatt hours), an absolute fuel requirement (e.g. a petrol or diesel requirement in litres), a normalized energy requirement (e.g. a power in kilowatts (i.e. an energy requirement per unit time) or an energy requirement per unit distance (e.g. kilometre) or per shipment) and/or a normalized fuel requirement (e.g. a petrol or diesel requirement in litres per unit time (e.g. minute or hour) or per unit distance (e.g. kilometre) or per shipment) that has been captured and/or determined by the respective vehicle during the respective delivery. The historical delivery information can be used, as disclosed below, for training a knowledge-based and/or self-learning system, for example.

It goes without saying that the invention is not restricted to the energy requirement of the respective vehicle as parameters. Further examples of a parameter capturable (e.g. captured) and/or determinable (e.g. determined) by the respective vehicle (that has made the respective delivery) during the respective delivery are a vehicle speed on the delivery route and/or on a section of the delivery route, a nature of the respective delivery route and/or of a section of the respective delivery route and/or a timing of the respective delivery.

Information is also intended to be understood in the present case to mean disclosure of applicable information in coded form (e.g. in the form of data and/or in the form of a signal).

A detail is intended to be understood to be represented by information if the information contains a representation of the detail, for example.

Besides details pertaining to an energy requirement, the historical delivery information for each of the deliveries of shipments associated with the delivery information represents at least details pertaining to a delivery route and pertaining to a vehicle configuration. Accordingly, the historical delivery information for each of the deliveries of shipments associated with the delivery information can represent, in addition to an energy requirement of the respective vehicle capturable (e.g. captured) and/or determinable (e.g. determined) by the respective vehicle that has made the respective delivery during the respective delivery, details pertaining to the delivery route along which the respective vehicle that has made the delivery has moved during the delivery and details pertaining to the vehicle configuration of the respective vehicle that has made the respective delivery.

In this context, details pertaining to a delivery route are intended to be understood to mean a representation of the delivery route (e.g. an orderly list of waypoint details). Details pertaining to a vehicle configuration represent one or more parameters characteristic of a vehicle, for example, such as a vehicle type, a vehicle motorization, a set of tyres on a vehicle and/or a vehicle design. It goes without saying that the invention is not restricted to these parameters characteristic of a vehicle. If a modular vehicle is involved, a vehicle configuration can represent and/or specify one or more modules with which the vehicle was and/or is intended to be equipped, for example.

Obtaining information in the present case is intended to be understood to mean that this information (e.g. in the form of a signal) is received by communication means and/or captured by capture means, for example. Information in the present case is intended to be understood to be kept, for example, if this information is stored in a memory (e.g. in the form of data) or a representation of this information is stored in a memory.

For example, historical delivery information associated with a delivery of shipments is received from the vehicle that has made the delivery (e.g. by means of communication means of the disclosed apparatus and/or of the disclosed system) and is subsequently stored (together with other historical delivery information) in a memory (e.g. a memory of the disclosed apparatus and/or of the disclosed system).

The multiple shipments to be delivered for which shipment delivery information is obtained are intended to be delivered within one delivery and/or by one vehicle (e.g. as part of one delivery order), for example. The trait that the shipment delivery information at least for each of the shipments represents a detail pertaining to the delivery position for the delivery of the respective shipment is intended to be understood, by way of example, such that the shipment delivery information contains a representation of the delivery position for the delivery of the respective shipment. Examples of a representation of a position (e.g. of a delivery position) are address, position and/or coordinate details. An address detail is, by way of example, a representation of a postal address (e.g. of a postal address of a recipient of a shipment). A coordinate detail is, by way of example, a representation of coordinates of a position such as a delivery position (e.g. coordinates of a position according to a satellite-assisted navigation system and/or a geographical coordinate system such as the UTM (Universal Transverse Mercator) coordinate system on the basis of the geodetic reference system WGS84 (World Geodetic System 1984)).

The trait that the determining of the delivery route and/or of the vehicle configuration is based at least partially on the shipment delivery information is intended to be understood, by way of example, such that the delivery route and the vehicle configuration are determined such that the determined delivery route describes a path along which a vehicle having the determined vehicle configuration can move in succession to the delivery positions represented by the shipment delivery information. For example, the determined delivery route describes a path from a collection position, at which the shipments can be collected by the vehicle, to the delivery positions represented by the shipment delivery information. The determined vehicle configuration represents, by way of example, characteristic parameters (e.g. a vehicle type, a vehicle motorization, a set of tyres on a vehicle and/or a vehicle design) of a vehicle suitable for moving along the determined delivery route. For example, first of all the delivery route and then a vehicle configuration suitable for the delivery route are determined. In this case, the determining of the delivery route can be based at least partially on the shipment delivery information. The determining of the vehicle configuration is subsequently effected at least partially based on the determined delivery route, for example.

It goes without saying that there may be a plurality of possible delivery routes describing different possible paths along which a vehicle can move in succession to the delivery positions represented by the shipment delivery information. Accordingly, the determining of the delivery route can comprise the selecting of the delivery route from the plurality of possible delivery routes.

Further, the determining of the delivery route (e.g. of the plurality of possible delivery routes) can be effected at least partially based on navigation map information. Navigation map information is intended to be understood to mean, by way of example, navigation and/or map data representing a map (e.g. transport route map such as a road map, a shipping lane map and/or an airway map) for determining a route (e.g. a delivery route). A map is intended to be, by way of example, a two-dimensional, three-dimensional or multidimensional (e.g. with time as the fourth dimension) model of an area (e.g. of a geographical area such as an area on and/or above the earth's surface). A map may be, by way of example, a map available on the market, or may be a map generated from sensor information from one or more autonomous and/or semiautonomous vehicles. Map data from such a map can contain geometric information (e.g. as a point cloud and/or octomap, cf. the article: Hornung, Armin, et al. "OctoMap: An efficient probabilistic 3D mapping framework based on octrees." Autonomous Robots 34.3 (2013): 189-206), semantic information, symbolic information, ambient features, landmarks, texts, photographs, change information over a particular period that are input by the user, and a lot of other additional information for representing the map, depending on the level of abstraction.

The determining of the expected energy requirement for the delivery of the shipments along the determined delivery route by a vehicle having the determined vehicle configuration can be effected by simulating the expected energy requirement for the delivery of the shipments along the determined delivery route by a vehicle having the determined vehicle configuration, for example. In this context, the simulating can be based at least partially on the historical delivery information. The expected energy requirement for the delivery of the shipments along the determined delivery route by a vehicle having the determined vehicle configuration is intended to be understood to mean the energy requirement expected for a vehicle having the determined vehicle configuration when this vehicle moves along the delivery route to deliver the shipments.

As a result of the expected energy requirement for the delivery of the shipments taking into consideration both the determined delivery route and the vehicle configuration, a particularly good approximation of the expected energy requirement to the actual energy requirement can be achieved. By determining the expected energy requirement when determining the delivery route and the vehicle configuration, it is therefore possible to achieve the effect that the combination of the determined delivery route and the determined vehicle configuration results in the most energy-efficient delivery possible. This is a significant improvement over methods for route planning that are known from the prior art in which the vehicle configuration of the vehicle making the delivery is not taken into consideration and is not predetermined for the delivery.

The provided delivery control information comprises, by way of example, a representation of the determined vehicle configuration and/or of the determined delivery route in order to cause the delivery of the shipments along the determined delivery route by a vehicle having the determined vehicle configuration. This can achieve the effect that the delivery is also actually made by a vehicle having this vehicle configuration and along this delivery route and therefore in as energy-efficient a manner as possible. For example, the delivery control information is provided by virtue of its being provided for retrieval by a user (e.g. a dispatcher) and/or a remote apparatus (e.g. an apparatus for selecting and/or configuring vehicles) and/or a vehicle and/or sent to a user and/or a remote apparatus and/or a vehicle. Further, the delivery control information can be provided by outputting to a user, for example.

The causing of the delivery of the shipments along the determined delivery route by a vehicle having the determined vehicle configuration comprises, by way of example, the selecting of a vehicle having the determined vehicle configuration or, if no vehicle having the determined vehicle configuration is available, (re)configuring of a vehicle according to the determined vehicle configuration. The (re)configuring can be effected, by way of example, by means of the replacement of modules if the vehicle is modular and the determined vehicle configuration represents and/or specifies one or more modules with which the vehicle is intended to be equipped.

Further, the causing of the delivery of the shipments along the determined delivery route by a vehicle having the determined vehicle configuration can comprise the actuating of the selected and/or (re)configured vehicle such that the vehicle is caused to move along the determined delivery route to deliver the shipments. For this purpose, the determined delivery route can be programmed into a navigation unit of the vehicle, for example.

Further advantages of the disclosed invention are described below on the basis of exemplary embodiments of the disclosed method, of the disclosed apparatus, of the disclosed system and of the disclosed computer program.

In one exemplary embodiment of the invention, the determining of the delivery route and of the vehicle configuration comprises the following steps:
  determining a possible delivery route (e.g. a first possible delivery route) for delivering the shipments (e.g. at least partially based on the shipment delivery information),
  determining a possible vehicle configuration (e.g. a first possible vehicle configuration) of a vehicle for delivering the shipments along the possible delivery route (e.g. at least partially based on the possible delivery route and/or the historical delivery information),
  determining the expected energy requirement for the delivery of the shipments along the possible delivery route by a vehicle having the possible vehicle configuration (e.g. at least partially based on the possible vehicle configuration, the possible delivery route and/or the historical delivery information).

The possible delivery route is determined, by way of example, at least partially based on the shipment delivery information such that it describes a path along which a vehicle can move in succession to the delivery positions represented by the shipment delivery information. Further, the determining of the possible delivery route can be effected using navigation map information. The possible delivery route is determined, by way of example, according to presets for determining the delivery route such as a predetermined route planning algorithm and/or one or more predetermined route criteria such as, by way of example, "shortest route" or "fastest route" or "most energy-efficient route" and/or a predetermined order of the delivery positions represented by the shipment delivery information. It goes without saying that the determining of the possible delivery route can be based, in some embodiments, not only on these presets and/or the shipment delivery information but, at least partially, also on other information such as, by way of example, traffic information (e.g. details pertaining to traffic delays such as queues and/or accidents and/or roadworks and/or closures). Such route planning algorithms are algorithms known in the prior art (e.g. heuristic algorithms), for example, for solving what is known as the commercial traveller problem.

Subsequently, by way of example, the possible vehicle configuration of a vehicle for delivering the shipments along the possible delivery route (i.e. the previously determined possible delivery route) can be determined at least partially based on the delivery route. For example, the possible vehicle configuration is determined such that it is expected that a vehicle having the possible vehicle configuration moves along the possible delivery route in an energy-efficient manner. The possible vehicle configuration is determined according to a predetermined vehicle configuration algorithm, for example.

Such a vehicle configuration algorithm can be based, by way of example, on predetermined associations between different properties of possible delivery routes and different vehicle configurations that, according to experience, are energy-efficient. In a simple example, there may be provision for the vehicle configuration to represent only one vehicle type. In this simple example, possible delivery routes having a length of less than 5 km may have the associated vehicle type of, by way of example, an "unmanned and autonomous electrically driven land vehicle" (e.g. an autonomous robot), delivery routes having a length of between 5 km and 10 km may have the associated vehicle type of, by way of example, an "unmanned and autonomous aircraft" (e.g. an aerial drone), and delivery routes having a length of more than 10 km may have the associated vehicle type, by way of example, an "autonomous or semiautonomous land vehicle having an internal combustion engine" (e.g. a car or a heavy goods vehicle), if the use of such vehicle types for delivery routes having these lengths has been found to be particularly energy-efficient in the past.

Alternatively or additionally, such a vehicle configuration algorithm may be based, by way of example, on a knowledge-based system (e.g. an expert system) and/or a self-learning system. Such a knowledge-based system and/or self-learning system may be based, by way of example, at least partially of the historical delivery information. For example, such a knowledge-based system and/or self-learning system can be trained based on the historical delivery information such that it determines a vehicle configuration for a vehicle for a determined delivery route such that it is expected that a vehicle having this vehicle configuration moves along this delivery route in as energy-efficient a manner as possible and/or that the expected energy requirement for the delivery of the shipments along this delivery route by a vehicle having this vehicle configuration is as low as possible. It goes without saying that such a knowledge-based system and/or self-learning system does not necessarily determine the most energy-efficient vehicle configuration and/or the vehicle configuration having the lowest expected energy requirement (e.g. because the historical delivery information is limited and permits only incomplete training).

Further, such a knowledge-based system and/or self-learning system can be trained based on the historical delivery information such that it determines for a determined delivery route not only a vehicle configuration but also an expected energy requirement for the delivery of the shipments along this delivery route by a vehicle having this vehicle configuration. It goes without saying that the actual energy requirement may differ from this expected energy requirement (e.g. because the historical delivery information is limited and permits only incomplete training). This training allows the knowledge-based system and/or self-learning system to be improved over a longer period (i.e. allows the quality of forecast, such as e.g. the quality of the relationship that the system maps between one or more vehicle configurations and an expected energy consumption, to be improved) and, by way of example, disparities between the expected energy requirement and the actual energy requirement to be reduced in comparison with a static system.

The basis of the training of a knowledge-based system and/or self-learning system may be an algorithm for machine learning, for example. Machine learning can be effected, by way of example, in the form of supervised machine learning, unsupervised machine learning and/or reinforcement machine learning. Algorithms for machine learning may be based at least partially on an artificial neural network, a support vector machine, a cluster analysis or a combination of several (e.g. all) of these techniques.

Alternatively or additionally, the determining of the expected energy requirement for the delivery of the shipments along the possible delivery route by a vehicle having the possible vehicle configuration can be effected by simulating and/or computing the expected energy requirement, for example. The simulating can be based, by way of example, on a mathematical and/or physical model of the vehicle having the possible vehicle configuration (e.g. a mathematical and/or physical model mapping the relationship between the vehicle configuration and the expected energy requirement), which model is used during simulation in order to be able to make a statement as to what the level of the expected energy requirement is. This can involve further information such as, by way of example, weather information and/or traffic information being taken into consideration. In this case too, the actual energy requirement can differ from this (e.g. simulated and/or computed) expected energy requirement.

Further, the determining of the delivery route and of the vehicle configuration can comprise the following step, for example:
  determining whether the expected energy requirement for the delivery of the shipments along the possible delivery route (e.g. the first possible delivery route) by a vehicle having the possible vehicle configuration (e.g. the first possible vehicle configuration) satisfies a predetermined energy requirement condition, and wherein the possible delivery route is determined (e.g. selected) as a delivery route for delivering the shipments, and the possible vehicle configuration is determined as a vehicle configuration for a vehicle for delivering the shipments along the delivery route, only if it is determined that the predetermined energy requirement condition is satisfied.

An energy requirement condition can predetermine, by way of example, an energy requirement in the form of an energy requirement threshold value that must not be exceeded by the expected energy requirement for the delivery of the shipments along the possible delivery route (e.g. the first possible delivery route) by a vehicle having the possible vehicle configuration (e.g. the first possible configuration) of a vehicle for delivering the shipments along this possible delivery route, in order to satisfy the energy requirement condition. In this context, an energy requirement, as disclosed above, is intended to mean, by way of example, an absolute energy requirement (e.g. an energy requirement in kilowatt hours), an absolute fuel requirement (e.g. a petrol or diesel requirement in litres), a normalized energy requirement (e.g. a power in kilowatts (i.e. an energy requirement per unit time) or an energy requirement per unit distance (e.g. kilometre) or per shipment) and/or a normalized fuel requirement (e.g. a petrol or diesel requirement in litres per unit time (e.g. minute or hour) or per unit distance (e.g. kilometre) or per shipment) that has been captured and/or determined by the respective vehicle during the respective delivery.

This is advantageous, by way of example, in order to check whether the combination of the possible delivery route and the possible vehicle configuration result in a most energy-efficient possible delivery of the shipments (i.e. delivery of the shipments with an expected energy requirement that satisfies the predetermined energy requirement condition).

For example, the determining of the delivery route and of the vehicle configuration when it is determined that the predetermined energy requirement condition is not satisfied comprises the following additional steps:
  determining at least one further possible delivery route (e.g. a second possible delivery route) for delivering the shipments,
  determining a further possible vehicle configuration (e.g. a second possible vehicle configuration) of a vehicle for delivering the shipments along the further delivery route,
  determining the expected energy requirement for the delivery of the shipments along the further possible delivery route by a vehicle having the further possible vehicle configuration,
  determining whether the expected energy requirement for the delivery of the shipments along the further possible delivery route by a vehicle having the further possible vehicle configuration satisfies the predetermined energy requirement condition.

These additional steps in connection with the further possible delivery route and the further possible vehicle configurations can be effected according to the above-disclosed steps in connection with the possible delivery route and the possible vehicle configuration, for example. Accordingly, the applicable disclosures in connection with the possible delivery route and the possible vehicle configuration are also intended to be understood to be disclosures in connection with the further possible delivery route and the further possible vehicle configuration.

In other words, the additional steps in connection with the further possible delivery route and the further possible vehicle configurations can be understood to be repetition of the above-disclosed steps in connection with the possible delivery route and the possible vehicle configuration. As the result of a first pass through these steps, a first possible delivery route and a first possible vehicle configuration are obtained, for example, and as the result of a first repetition of these steps, a second possible delivery route (e.g. a second delivery route different from the first) and a second possible vehicle configuration (e.g. a second vehicle configuration different from the first) are obtained, for example.

In this case, however, it is possible to take measures to prevent the same expected energy requirement from being determined for the delivery of the shipments along the further possible delivery route by a vehicle having the possible further vehicle configuration. For example, the further possible delivery route (e.g. the second possible delivery route) can be determined such that it is different from the previously determined possible delivery route (e.g. the first possible delivery route and/or all previously determined possible delivery routes). For this purpose, the determining of the further possible delivery route can be effected according to at least partially different presets from the determining of the previously determined possible delivery route (e.g. all previously determined possible delivery routes), for example according to a different predetermined route planning algorithm and/or one or more different predetermined route criteria such as, by way of example, "shortest route" or "fastest route" or "most energy-efficient route" and/or a different predetermined order of the delivery positions represented by the shipment delivery information. It goes without saying that it is sufficient to change one of the presets for determining the further possible delivery route as compared with the determining of the previously determined possible delivery route (e.g. all previously determined possible delivery routes). By way of example, the determining of the further possible delivery route can be effected according to the same predetermined route planning algorithm as the determining of the previously determined possible delivery route (e.g. all previously determined possible delivery routes) and according to a different predetermined order from the determining of the previously determined possible delivery route (e.g. all previously determined possible delivery routes).

Thereafter, it is possible, by way of example, for the further possible vehicle configuration of a vehicle for delivering the shipments along the further possible delivery route to be determined at least partially based on the previously determined further possible delivery route.

If it is subsequently determined that the expected energy requirement for the delivery of the shipments along the further possible delivery route by a vehicle having the possible further vehicle configuration satisfies the predetermined energy requirement condition, it is possible, by way of example, for the further possible delivery route and the further possible vehicle configuration to be determined (e.g. selected) as delivery route and as vehicle configuration. Otherwise, these steps are repeated, by way of example, with at least partially altered presets for the determining of a further possible delivery route until the predetermined energy requirement condition is satisfied or a termination condition (e.g. a maximum number of repetitions) is reached. As a result, a functional principle as with a genetic and/or evolutionary algorithm is obtained.

The determining of the possible delivery route (e.g. the first possible delivery route) and/or of the further possible delivery route (e.g. the second possible delivery route) is effected by a route planning component of the disclosed apparatus and/or of the disclosed system, for example. A knowledge-based system and/or self-learning system for determining the possible vehicle configuration (e.g. the first vehicle configuration) and/or the further possible vehicle configuration (e.g. the second vehicle configuration) can be formed by a knowledge-based and/or self-learning vehicle configuration component of the disclosed apparatus and/or the disclosed system, for example. This knowledge-based and/or self-learning vehicle configuration component can further also be used for determining the expected energy requirement. Alternatively or additionally, the expected energy requirement can also be simulated and/or computed by a simulation and/or computation component of the disclosed apparatus and/or of the disclosed system. These components can be formed as (e.g. at least partially or completely different) hardware components (e.g. as server apparatuses of the disclosed system) and/or software components (e.g. as computer programs executed on a processor of the disclosed apparatus) and/or as a combination of (e.g. at least partially or completely different) hardware and software components of the disclosed apparatus and/or of the disclosed system.

In one exemplary embodiment of the invention, the determining of the delivery route and of the vehicle configuration comprises the following steps:

selecting the determined delivery route from a plurality of possible delivery routes for delivering the shipments and/or the determined vehicle configuration from a plurality of possible vehicle configurations for a vehicle for delivering the shipments along the delivery route.

In this case, the plurality of possible delivery routes and the plurality of possible vehicle configurations can be provided according to the above-disclosed steps for determining the possible delivery route and the possible vehicle configuration. Accordingly, the plurality of possible delivery routes can comprise at least a first possible delivery route and a second possible delivery route (e.g. a second delivery route different from the first) and the plurality of possible vehicle configurations can comprise at least a first possible vehicle configuration and a second possible vehicle configuration (e.g. a second vehicle configuration different from the first).

There may be provision for each of the possible delivery routes from the plurality of possible delivery routes to be determined such that it is different from the other possible delivery routes from the plurality of possible delivery routes. For this purpose, the determining of each of the possible delivery routes from the plurality of possible delivery routes can be effected according to at least partially different presets from the determining of the other possible delivery routes from the plurality of possible delivery routes, for example according to a different predetermined route planning algorithm and/or one or more different predetermined route criteria such as, by way of example, "shortest route" or "fastest route" or "most energy-efficient route" and/or a different predetermined order of the delivery positions represented by the shipment delivery information. In this case, it may be sufficient if one of the presets is different. By way of example, each of the possible delivery routes from the plurality of delivery routes can be determined according to the same predetermined route planning algorithm and according to a different predetermined order of the delivery positions.

Further, the expected energy requirement for the delivery of the shipments along the respective possible delivery route by a vehicle having the respective possible vehicle configuration can be determined for each of the possible delivery routes and/or each of the possible vehicle configurations, wherein the delivery route from the possible delivery routes and/or the vehicle configuration from the possible vehicle configurations having the lowest expected energy requirement is selected for the delivery of the shipments.

In one exemplary embodiment of the invention, the determining of the delivery route and of the vehicle configuration is effected at least partially according to an evolutionary algorithm and/or an algorithm for machine learning.

In one exemplary embodiment of the invention, the historical delivery information for each of the deliveries of shipments associated with the delivery information further represents at least one or more of the following details:
- a detail pertaining to a vehicle speed and/or vehicle acceleration on the delivery route and/or on a section of the delivery route for the delivery of shipments associated with the respective delivery information,
- a detail pertaining to the nature of the delivery route and/or of a section of the delivery route for the delivery of shipments associated with the respective delivery information, and/or
- a detail pertaining to the timing of the delivery of shipments associated with the respective delivery information.

A detail pertaining to a vehicle speed represents, by way of example, a vehicle speed of the vehicle on the delivery route and/or on a section of the delivery route that is captured and/or determined by the vehicle. For example, a detail pertaining to a vehicle speed can represent an average vehicle speed of the vehicle on the delivery route and/or on a section of the delivery route that is captured by the vehicle. Alternatively, a detail pertaining to a vehicle speed can represent a vehicle speed of the vehicle that is captured by the vehicle at a particular position on the delivery route.

A detail pertaining to a vehicle acceleration represents, by way of example, a vehicle acceleration (i.e. acceleration and/or deceleration) of the vehicle on the delivery route and/or on a section of the delivery route that is captured and/or determined by the vehicle. For example, a detail pertaining to a vehicle acceleration can represent an average vehicle acceleration of the vehicle on the delivery route and/or on a section of the delivery route that is captured by the vehicle. Alternatively, a detail pertaining to a vehicle acceleration can represent a vehicle acceleration of the vehicle that is captured by the vehicle at a particular position on the delivery route.

If the detail pertaining to the vehicle speed and/or vehicle acceleration represents a captured vehicle speed and/or vehicle acceleration, it can further represent, by way of example, a capture time (e.g. at which the vehicle speed and/or the vehicle acceleration was captured) and/or a capture position (e.g. at which the vehicle speed and/or the vehicle acceleration was captured). If the detail pertaining to the vehicle speed and/or vehicle acceleration represents an average vehicle speed and/or vehicle acceleration, on the other hand, it can further represent, by way of example, a capture period (e.g. for which the average vehicle speed and/or the average acceleration was determined) and/or a capture section (e.g. a section of the delivery route for which the average vehicle speed and/or the average vehicle acceleration was determined). It goes without saying that the detail pertaining to the vehicle speed and/or vehicle acceleration can represent a vector (e.g. a speed vector and/or an acceleration vector) and/or an absolute value (e.g. an absolute value of a speed and/or acceleration of the vehicle).

Such details pertaining to the vehicle speed and/or vehicle acceleration allow conclusions to be drawn about the volume of traffic and/or possible delays on the delivery route and/or on a section on the delivery route, for example.

A detail pertaining to a nature of the delivery route and/or of a section of the delivery route is intended to be understood to mean, by way of example, parameters captured and/or determined by the vehicle that are characteristic of the nature of the delivery route and/or of a section of the delivery route, such as a gradient (e.g. a maximum and/or minimum and/or average gradient) and/or a transport route surface (e.g. asphalt and/or gravel and/or earth) and/or the presence of obstacles (e.g. one or more steps, a fence, etc.) on the delivery route and/or on a section of the delivery route. Further, a detail pertaining to a nature of the delivery route and/or of a section of the delivery route can represent a capture time and/or a capture period and/or a capture position and/or a capture section, for example.

Such details pertaining to the nature of the delivery route and/or of a section of the delivery route can establish a relationship between this nature and the vehicle behaviour (e.g. a captured and/or determined vehicle speed and/or vehicle acceleration), for example.

A detail pertaining to the timing of the delivery of shipments associated with the respective delivery information can represent, by way of example, the timing of the delivery of shipments associated with the respective delivery information. For example, a detail pertaining to the timing of the delivery of shipments associated with the respective delivery information can represent in each case the time captured and/or determined by the vehicle at which the vehicle has reached a shipment delivery position. By way of example, this permits conclusions regarding the length of time that the vehicle has needed in order to move from one shipment delivery position to the next shipment delivery position along the delivery route.

These details can advantageously be taken into consideration when training an above-disclosed knowledge-based and/or self-learning system for determining the vehicle configuration, for example.

In one exemplary embodiment of the invention, the shipment delivery information for each of the shipments further represents at least one or more of the following details:
- a detail pertaining to external dimensions of the respective shipment,
- a detail pertaining to a weight of the respective shipment,
- a detail pertaining to a delivery time and/or pertaining to a delivery period for the delivery of the respective shipment,
- a detail pertaining to a nature of the delivery position for the delivery of the respective shipment, and/or
- a detail pertaining to a recipient name and/or pertaining to a recipient address for the respective shipment.

A detail pertaining to external dimensions of the respective shipment represents the external dimensions of the respective shipment, for example; and a detail pertaining to a weight of the respective shipment represents the weight of the respective shipment, for example.

A detail pertaining to a delivery time for the delivery of the respective shipment represents a time at which the respective shipment is supposed to be delivered at the respective shipment delivery position, for example. Accordingly, a delivery period for the delivery of the respective shipment represents a period in which the respective shipment is supposed to be delivered at the respective shipment delivery position, for example.

A detail pertaining to a nature of the delivery position for the delivery of the respective shipment is intended to be understood to mean, by way of example, a parameter characteristic of the expected nature of the delivery route at the delivery position, such as a gradient (e.g. a maximum and/or minimum and/or average gradient) and/or a transport route surface (e.g. asphalt and/or gravel and/or earth) and/or the presence of obstacles (e.g. one or more steps, a fence, etc.).

A detail pertaining to a recipient name and/or to a recipient address represents the recipient name and/or the recipient address, for example.

These details permit efficient determination of the vehicle configuration, for example. As such, a different vehicle configuration can allow a most energy-efficient delivery possible for a shipment having larger external dimensions or a higher weight than for a shipment having smaller external dimensions or a lower weight, for example. If a detail pertaining to a nature of the delivery position reveals that there are obstacles such as steps or a fence at the delivery position, a vehicle configuration for a vehicle that can overcome these obstacles (e.g. an aircraft such as an aerial drone in the case of steps or a fence) is determined, for example.

In one exemplary embodiment of the invention, the method further comprises the following steps:
obtaining and/or keeping environmental information associated with the delivery of the shipments, wherein the determining of the delivery route and/or of the vehicle configuration and/or of the expected energy requirement is further based at least partially on the environmental information.

Environmental information represents capturable and/or determinable (e.g. forecastable) environmental parameters that can influence the expected energy requirement, for example.

The environmental information can comprise, by way of example, weather information representing at least one detail pertaining to the expected weather and/or pertaining to the expected position of the sun (e.g. the expected weather and/or the expected position of the sun at at least one delivery position from the delivery positions and/or on the delivery route and/or on a section of the delivery route). The weather information is provided by a weather service and/or at least partially based on environmental parameters captured by sensors, for example.

Alternatively or additionally, the environmental information can comprise traffic information representing at least one detail pertaining to expected traffic delays (e.g. expected traffic delays on the delivery route and/or on a section of the delivery route) such as queues and/or accidents and/or roadworks and/or closures. The traffic information is provided by a traffic service and/or at least partially based on traffic parameters captured by sensors, for example.

In particular, the determining of the expected energy requirement and/or of the vehicle configuration may be based at least partially on the environmental information. For example, the expected energy requirement for vehicles having an electric drive and photovoltaic modules can change depending on the expected weather and/or position of the sun. If sunny weather is expected on the delivery route, a vehicle configuration representing a vehicle having an electric drive and photovoltaic modules is determined, for example, whereas if cloudy weather is expected on the delivery route, a vehicle configuration representing a vehicle having an internal combustion engine is determined, for example.

In one exemplary embodiment of the invention, the method further comprises the following step:
obtaining historical delivery information associated with the delivery of the shipment when the vehicle having the determined vehicle configuration has delivered the shipments along the determined delivery route, wherein the delivery information represents at least details pertaining to the determined delivery route, pertaining to the energy requirement and pertaining to the determined vehicle configuration.

In one exemplary embodiment of the invention, the method further comprises the following steps:
obtaining and/or keeping navigation map information for determining a delivery route for delivering the shipments.

Further advantageous exemplary configurations of the invention can be found in the detailed description of a few exemplary embodiments of the present invention that follows, in particular in conjunction with the figures. The figures accompanying the application are intended to be used only for the purpose of clarification, however, rather than for determining the scope of protection of the invention. The accompanying drawings are not necessarily to scale and are merely intended to reflect the general concept of the present invention by way of example. In particular, features included in the figures are by no means intended to be considered to be a necessary part of the present invention.

DETAILED DESCRIPTION

Figure 1A:
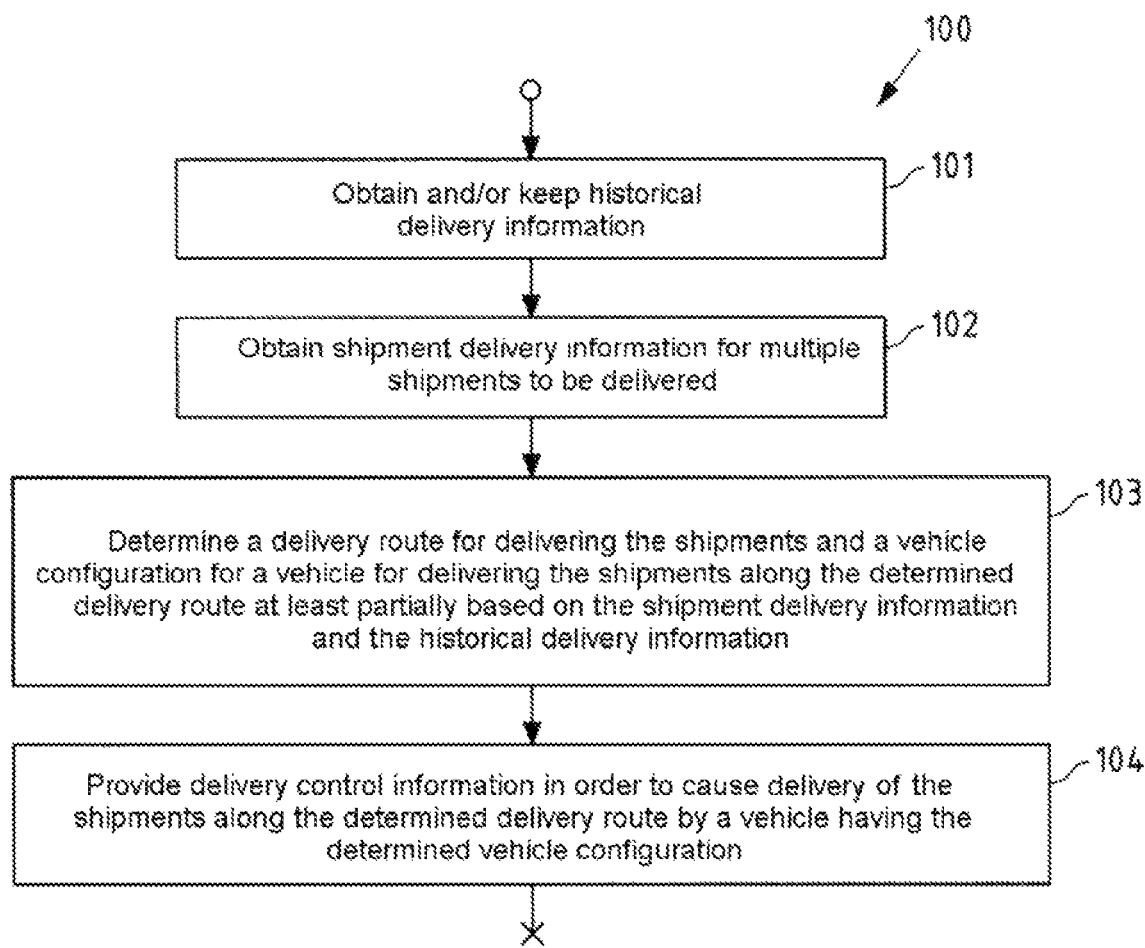
FIG. 1a shows a flowchart for an exemplary embodiment of a method according to an exemplary aspect of the invention.

FIG. 1a shows a flowchart with steps of an exemplary embodiment of a method according to an exemplary aspect of the invention. Steps 101 to 104 of the flowchart 100 can be performed by an apparatus like the apparatus 200 from FIG. 2 disclosed below or by a system like the system 300 from FIG. 3 disclosed below, for example.

It is subsequently assumed by way of example that the method is performed by an apparatus and/or a system of a delivery service (e.g. a postal and/or parcel service). Several different vehicles of the delivery service are configured, by way of example, such that, after they have made a delivery of shipments (i.e. multiple shipments) for a delivery order, they communicate historical delivery information associated with the delivery to the apparatus and/or the system, which performs steps 101 to 104 of the flowchart 100. A vehicle of the delivery service making such a delivery of shipments is an appropriately configured autonomous and/or semiautonomous land vehicle, watercraft and/or an aircraft, for example.

In this context, the delivery of shipments (i.e. multiple shipments) is intended to be understood in the present case to mean, by way of example, the transport of each of the shipments by the vehicle making the delivery along a delivery route to a respective delivery position for the delivery of the respective shipment. At the respective delivery position, the respective shipment is provided by the vehicle or a delivery agent for collection and/or receipt by the recipient of the shipment (e.g. in a receiving compartment of a receiving apparatus such as a post box and/or parcel box), for example.

In step 101, the historical delivery information is obtained and/or provided. In this case, the historical delivery information is associated with multiple deliveries of shipments made by one or various vehicles of the delivery service, wherein the historical delivery information for each of the deliveries of shipments associated with the historical delivery information represents at least details pertaining to a delivery route, pertaining to an energy requirement and pertaining to a vehicle configuration.

The historical delivery information represents one or more details characteristic of the respective delivery of shipments for each of the deliveries of shipments associated with the delivery information, for example. As disclosed above, such a detail characteristic of a delivery of shipments is intended to represent, by way of example, at least one parameter captured and/or determined by the vehicle that has made the delivery during the respective delivery, such as the energy requirement of the vehicle.

It is subsequently assumed by way of example that the historical delivery information for each of the deliveries of shipments associated with the historical delivery information represents the delivery route along which the respective vehicle (i.e. the vehicle that has made the respective delivery) has been moved, the energy requirement of the respective vehicle and the vehicle configuration of the respective vehicle.

The historical delivery information can, as disclosed below, be used for training a knowledge-based and/or self-learning system, for example.

In a step 102, shipment delivery information for multiple shipments to be delivered is obtained, wherein the shipment delivery information represents, at least for each of the shipments, a detail pertaining to the delivery position for the delivery of the respective shipment.

The multiple shipments to be delivered for which shipment delivery information is obtained are intended to be delivered for a delivery order within one delivery and/or by one vehicle of the delivery service, for example. The trait that the shipment delivery information represents, at least for each of the shipments, a detail pertaining to the delivery position for the delivery of the respective shipment is intended to be understood, by way of example, such that the shipment delivery information contains a representation of the delivery position for the delivery of the respective shipment.

Subsequently, in a step 103, a delivery route for delivering the shipments and a vehicle configuration for a vehicle for delivering the shipments along the determined delivery route are determined at least partially based on the shipment delivery information and the historical delivery information.

Figure 1B:
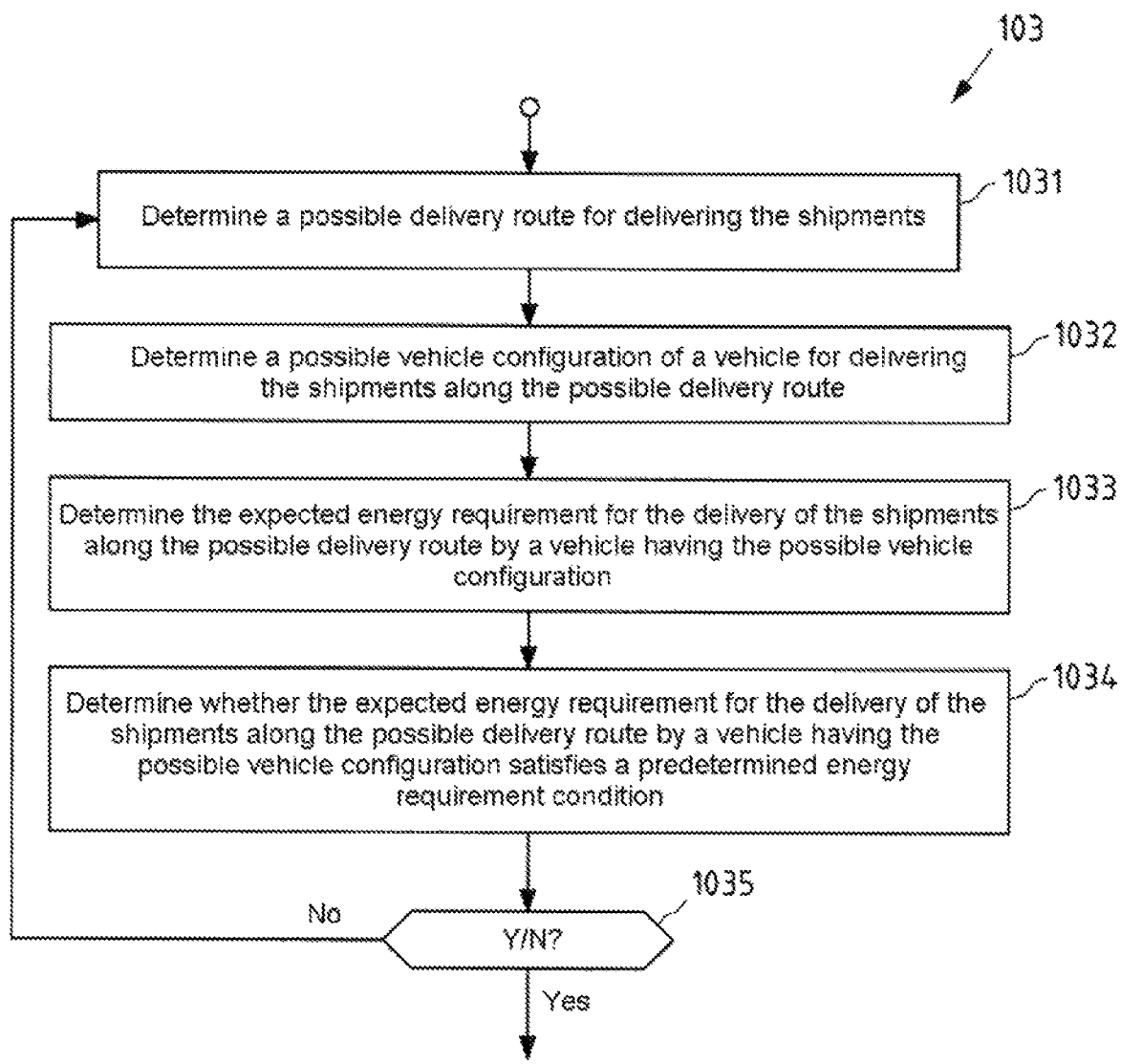
FIG. 1b shows optional steps of an exemplary embodiment of a method according to an exemplary aspect of the invention.

An exemplary embodiment of the determining according to step 103 is disclosed below on the basis of steps 1031 to 1035 from FIG. 1*b*. However, it goes without saying that the invention is not restricted to this embodiment.

In a step 1031, a possible delivery route for delivering the shipments is determined. The possible delivery route is determined, by way of example, at least partially based on the shipment delivery information such that it describes a path along which a vehicle can move in succession to the delivery positions represented by the shipment delivery information. Further, the determining of the possible delivery route can be effected using navigation map information. The possible delivery route is determined, by way of example, according to a predetermined route planning algorithm and/or one or more predetermined route criteria such as, by way of example, "shortest route" or "fastest route" or "most energy-efficient route" and/or a predetermined order of the delivery positions represented by the shipment delivery information. Such route planning algorithms are algorithms (e.g. heuristic algorithms) for solving what is known as the commercial traveller problem, for example.

Subsequently, in a step 1032, a possible vehicle configuration of a vehicle for delivering the shipments along the possible delivery route determined in step 1031 can be determined at least partially based on the possible delivery route determined in step 1031.

The possible vehicle configuration is determined according to a predetermined vehicle configuration algorithm, for example. Such a vehicle configuration algorithm may be based on a knowledge-based system (e.g. an expert system) and/or a self-learning system, for example. Such a knowledge-based system and/or self-learning system may be based, by way of example, at least partially on the historical delivery information. For example, such a knowledge-based system and/or self-learning system can be trained based on the historical delivery information such that it determines a possible vehicle configuration for a vehicle for a possible delivery route determined in step 1031 such that it is expected that a vehicle having this possible vehicle configuration will move along this possible delivery route in as energy-efficient a manner as possible and/or that the expected energy requirement for the delivery of the shipments along this possible delivery route by a vehicle having this possible vehicle configuration will be as low as possible. It goes without saying that such a knowledge-based system and/or self-learning system does not necessarily determine the possible vehicle configuration that is the most energy-efficient and/or the possible vehicle configuration having the lowest expected energy requirement (e.g. because the historical delivery information is limited and permits only incomplete training).

The basis for the training of a knowledge-based system and/or self-learning system may be an algorithm for machine learning, for example. Machine learning can be effected, by way of example, in a form of supervised machine learning, unsupervised machine learning and/or reinforcement machine learning. Algorithms for machine learning may be based at least partially on an artificial neural network, a support vector machine, a cluster analysis or a combination of several (e.g. all) of these techniques. This training allows the knowledge-based system and/or self-learning system to be improved over a longer period (i.e. the quality of forecast such as e.g. the quality of the relationship that the system maps between one or more vehicle configurations and an expected energy consumption) and, by way of example, disparities between the expected energy requirement and the actual energy requirement to be reduced in comparison with a static system.

In a step 1033, an expected energy requirement for the delivery of the shipments along the possible delivery route determined in step 1031 by a vehicle having the possible vehicle configuration determined in step 1032 is determined.

The determining of the expected energy requirement in step 1033 can, by way of example, likewise be effected by the knowledge-based system and/or self-learning. For example, said system can be trained based on the historical delivery information such that, for a possible delivery route determined in step 1031, it determines not only a possible vehicle configuration but also an expected energy requirement for the delivery of the shipments along this delivery route by a vehicle having this vehicle configuration. In this case, steps 1032 and 1033 can also be combined in one step.

Alternatively or additionally, the determining of the expected energy requirement in step 1033 can be effected, by way of example, by simulating and/or computing the expected energy requirement at least partially based on the possible delivery route determined in step 1031 and the possible vehicle configuration determined in step 1032.

In a step 1034, it is determined whether the expected energy requirement for the delivery of the shipments along the possible delivery route by a vehicle having the possible vehicle configuration satisfies a predetermined energy requirement condition.

An energy requirement condition can predetermine, by way of example, an energy requirement in the form of an energy requirement threshold value that must not be exceeded by the expected energy requirement for the delivery of the shipments along the possible delivery route (e.g. the first possible delivery route) by a vehicle having the possible vehicle configuration (e.g. the first possible vehicle configuration) of a vehicle for delivering the shipments along this possible delivery route, in order to satisfy the energy requirement condition.

If the determining in step 1034 reveals that the energy requirement condition is satisfied, the possible delivery route determined in step 1031 can be determined as the delivery route for the delivery of the shipments and the possible vehicle configuration determined in step 1032 can be determined as the vehicle configuration for a vehicle for delivering the shipments, and the flowchart 100 can be continued in step 104.

Otherwise, steps 1031 to 1034 are repeated, for example, and a further possible delivery route and a further possible vehicle configuration are determined.

In this case, however, it is possible to take measures to prevent the same expected energy requirement from being determined for the delivery of the shipments along the further possible delivery route by a vehicle having the possible further vehicle configuration. For example, the further possible delivery route can be determined for such repetition such that it is different from all the previously determined possible delivery routes (e.g. for the first pass and/or one or more previous repetitions of steps 1031 to 1034). For this purpose, the determining of the further possible delivery route can be effected according to at least partially different presets from the determining of the previously determined possible delivery routes, for example according to a different predetermined route planning algorithm and/or one or more different predetermined route criteria such as, by way of example, "shortest route" or "fastest route" or "most energy-efficient route" and/or a different predetermined order of the delivery positions represented by the shipment delivery information. It goes without saying that it is sufficient to change one of the presets for determining the further possible delivery route as compared with the determining of the previously determined possible delivery route (e.g. all previously determined possible delivery routes). By way of example, just the predetermined order of the shipment delivery positions can be altered with each repetition.

The steps 1031 to 1034 are repeated, by way of example, until the predetermined energy requirement condition is satisfied or a termination condition (e.g. a maximum number of repetitions) is reached (cf. step 1035). As a result, a functional principle as for a genetic and/or evolutionary algorithm is obtained.

In step 104, delivery control information is provided in order to cause delivery of the shipments along the determined delivery route by a vehicle having the determined vehicle configuration.

The provided delivery control information comprises a representation of the determined vehicle configuration and/or of the determined route, for example, in order to cause the delivery of the shipments along the determined delivery route by a vehicle having the determined vehicle configuration. For example, the delivery control information is provided for retrieval by a user (e.g. a dispatcher) and/or a remote apparatus (e.g. an apparatus for selecting and/or configuring vehicles) and/or a vehicle and/or is sent to a user and/or a remote apparatus and/or a vehicle. Further, the delivery control information can be provided by outputting it to a user, for example.

The causing of the delivery of the shipments along the determined delivery route by a vehicle having the determined vehicle configuration comprises, by way of example, the selecting of a vehicle having the determined vehicle configuration or, if no vehicle having the determined vehicle configuration is available, (re)configuring of a vehicle according to the determined vehicle configuration. The (re)configuring can be effected, by way of example, by means of the replacement of modules if the vehicle is modular and the determined vehicle configuration represents and/or specifies one or more modules with which the vehicle is intended to be equipped.

Further, the causing of the delivery of the shipments along the determined delivery route by a vehicle having the determined vehicle configuration can comprise the actuating of the selected and/or (re)configured vehicle such that the vehicle is caused to move along the determined delivery route to deliver the shipments. For this purpose, the determined delivery route can be programmed into a navigation unit of the vehicle, for example.

Figure 2:
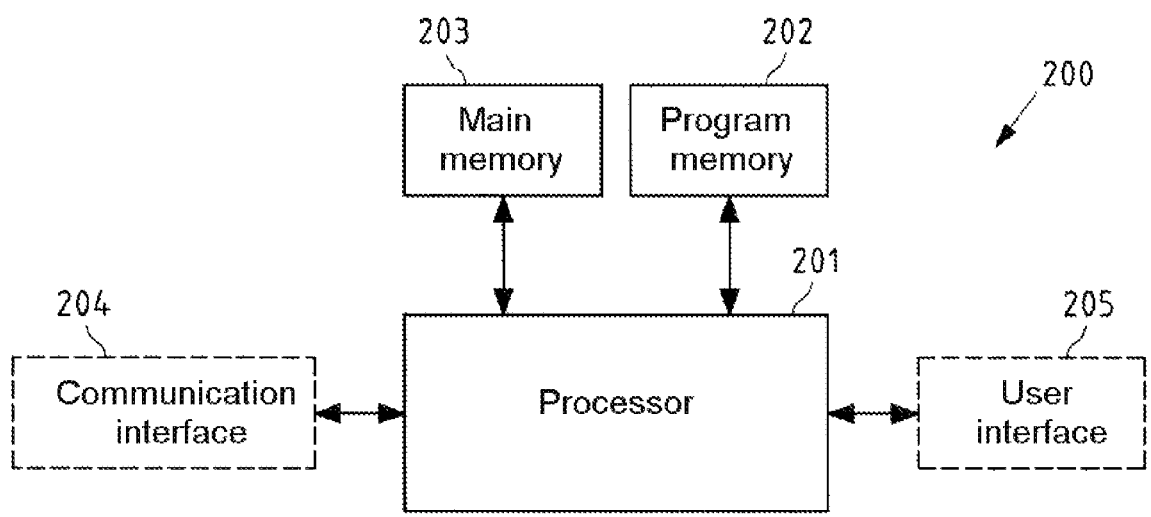
FIG. 2 shows a schematic depiction of an embodiment of an apparatus according to an exemplary aspect of the invention.

FIG. 2 is a schematic depiction of an exemplary embodiment of an apparatus 200 according to an exemplary aspect of the invention. It is subsequently assumed by way of example that the apparatus 200 is a (e.g. central) server apparatus of a delivery service for at least partially controlling deliveries to be made by vehicles of the delivery service and/or delivery orders of the delivery service.

The apparatus 200 comprises, by way of example, a processor 201 and, connected to the processor 201, a first memory as a program and data memory 202, a second memory as a main memory 203, an optional communication interface 204 and an optional user interface 205.

A processor is intended to be understood to mean, by way of example, a microprocessor, a microcontrol unit, a microcontroller, a Digital Signal Processor (DSP), an Application-Specific Integrated Circuit (ASIC) or a Field Programmable Gate Array (FPGA). It goes without saying that the apparatus 200 can also comprise multiple processors 201.

Processor 201 executes program instructions stored in program memory 202 and stores, by way of example, intermediate results or the like in main memory 203. The program memory 202 contains, by way of example, program instructions of a computer program (e.g. a computer program disclosed according to an exemplary aspect of the invention) that cause the processor 201 to perform and/or control a method disclosed according to an exemplary aspect of the invention (e.g. the method according to the flowchart 100 depicted in FIG. 1) when the processor 201 executes these program instructions stored in program memory 202. Moreover, program memory 202 may store, by way of example, historical delivery information, for example in the form of data (e.g. data of a database).

Program memory 202 further contains, by way of example, the operating system of the apparatus 200, which is loaded at least partially into main memory 203 when the apparatus 200 is started, and is executed by the processor 201. In particular, when the apparatus 200 is started, at least part of the core of the operating system is loaded into the main memory 203 and executed by processor 201.

An example of an operating system is a Windows, UNIX, Linux, Android, Apple iOS and/or MAC OS operating system. The operating system in particular allows the use of the apparatus for information and/or data processing. By way of example, it manages resources such as a main memory and a program memory, uses programming interfaces, inter alia, to provide other computer programs with fundamental functions and controls the execution of computer programs.

A program memory is, by way of example, a non-volatile memory such as a flash memory, a magnetic memory, an EEPROM (Electrically Erasable Programmable Read Only Memory) memory and/or an optical memory. A main memory is, for example, a volatile or non-volatile memory, in particular a Random Access Memory (RAM) such as a static RAM (SRAM) memory, a dynamic RAM (DRAM) memory, a Ferroelectric RAM (FeRAM) memory and/or a magnetic RAM (MRAM) memory.

Main memory 203 and program memory 202 may also be configured as one memory. Alternatively, main memory 203 and/or program memory 202 may each be formed by multiple memories. Further, main memory 203 and/or program memory 202 may also be part of the processor 201.

Processor 201 controls the optional communication interface 204, which is configured as a wireless and/or wired communication interface, for example. A wireless and/or wired communication interface can receive information (via a wireless and/or wired communication path) and forward it to the processor 201 and/or can receive information from the processor 201 and send it (via a wireless and/or wired communication path).

An example of a wireless communication interface is a wireless network adapter. For example, a wireless communication interface comprises, besides an antenna, at least one transmitter circuit and one receiver circuit or a transceiver circuit. Examples of a wireless communication interface are a GSM, UMTS and/or LTE interface and/or a WLAN and/or Bluetooth interface. The GSM, UMTS and LTE specifications are maintained and developed by the 3$^{rd}$ Generation Partnership Project (3GPP) and are currently available on the Internet at www.3gpp.com, inter alia. WLAN is specified in the Standards of the IEEE-802.11 family, for example. The Bluetooth specifications are currently available on the Internet at www.bluetooth.org.

An example of a wired communication interface is a wired network adapter. For example, a wired communication interface comprises at least one transmitter circuit and one receiver circuit or a transceiver circuit. An example of a wired communication interface is an Ethernet interface. Ethernet is specified in the standards of the IEEE-802.3 family, inter alia.

The communication interface 204 is configured for receiving information (e.g. the historical delivery information and/or the shipment delivery information) and/or for sending information (e.g. the delivery control information), for example.

Further, processor 201 controls the optional user interface 205, which is configured for outputting information (e.g. the delivery control information) to a user and/or for capturing information input by a user (e.g. the shipment delivery information). A user interface can comprise a keyboard, a mouse, a screen, a touch sensitive screen, a loudspeaker and/or a microphone, for example.

The components 201 to 205 of the apparatus 200 are communicatively and/or operatively connected to one another via one or more bus systems (e.g. one or more serial and/or parallel bus links), for example.

It goes without saying that the apparatus 200 can comprise further components besides the components 201 to 205.

Figure 3:
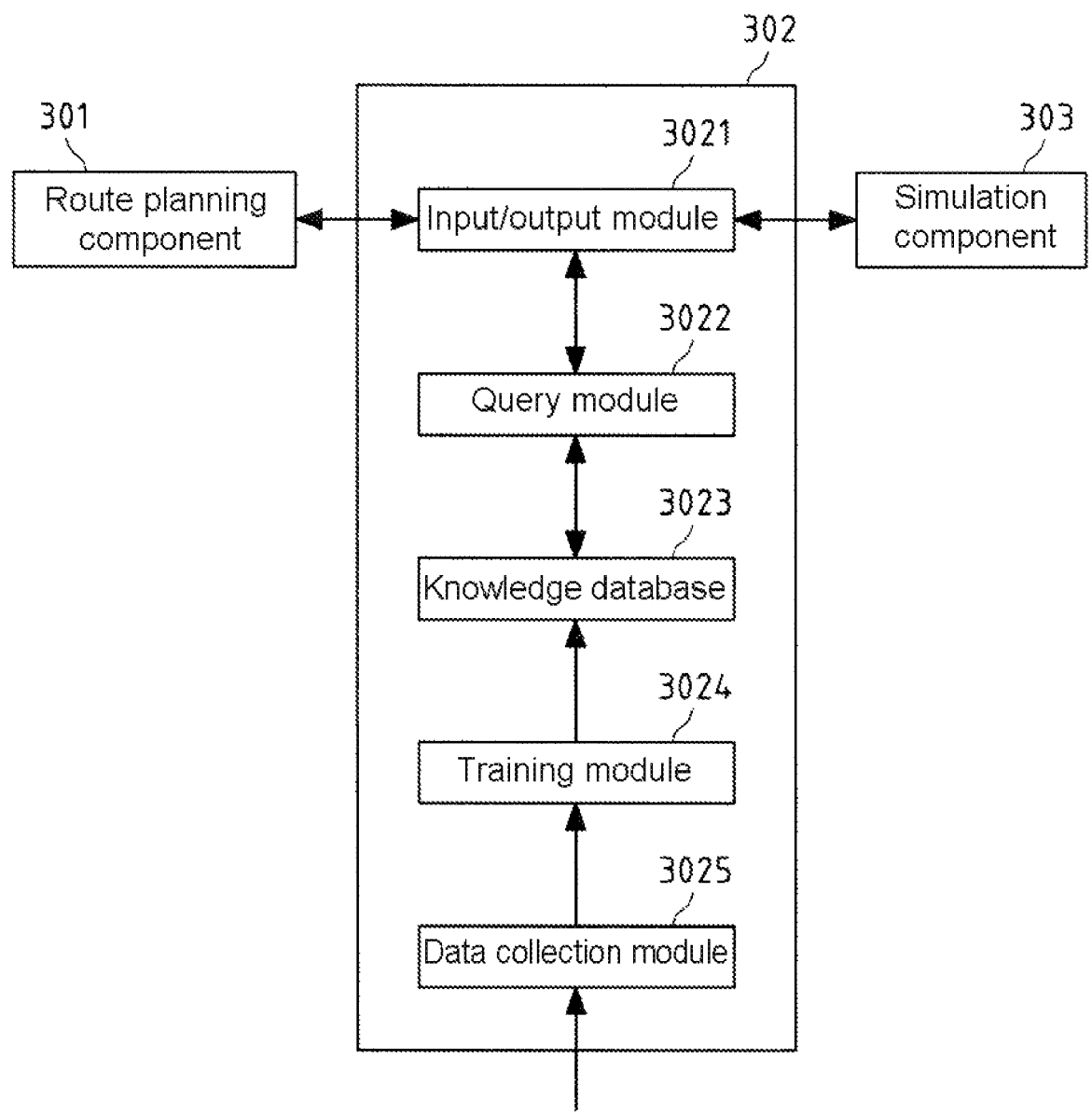
FIG. 3 shows a schematic depiction of an embodiment of a system according to an exemplary aspect of the invention.

FIG. 3 shows a schematic depiction of an embodiment of a system 300 according to an exemplary aspect of the invention. It is subsequently assumed by way of example that the system 300 is a (e.g. central) system of a delivery service for at least partially controlling deliveries to be made by vehicles of the delivery service and/or delivery orders of the delivery service.

System 300 comprises a route planning component 301, a knowledge-based and self-learning vehicle configuration component 302 and an optional simulation component 303. These components can be formed as (e.g. at least partially or completely different) hardware components (e.g. as server apparatuses of a server cloud) and/or software components (e.g. as computer programs executed on a processor of the apparatus 200 disclosed above in conjunction with FIG. 2) and/or as a combination of (e.g. at least partially or completely different) hardware and software components.

The route planning component 301 is, by way of example, configured for determining a possible delivery route. For example, the route planning component 301 is configured to perform step 1031 disclosed above in conjunction with FIG. 1b.

The route planning component 301 is based, by way of example, on an (e.g. modified) algorithm (e.g. a heuristic algorithm) for solving what is known as the commercial traveller problem, in order to determine the "best" possible delivery route for the delivery of shipments. In this case, the "best" possible delivery route is, by way of example, the "most energy-efficient route" (e.g. the delivery route having a lowest possible energy requirement per shipment), wherein the route planning component 301 determines the energy requirement per shipment only on the basis of the length of the possible delivery route, the expected duration of the delivery of the shipments along the possible delivery route and the weight of the shipments, for example, which means that it does not actually have to be the "most energy-efficient route". Further, the route planning component 301 can take into consideration presets for determining the delivery route (e.g. a predetermined order of the delivery positions of the shipments on the delivery route) and/or shipment delivery information for the shipments to be delivered (e.g. details pertaining to the external dimensions and/or pertaining to the weight, and/or a detail pertaining to the delivery times and/or delivery periods) and/or traffic information (e.g. details pertaining to traffic delays such as queues and/or accidents and/or roadworks and/or closures) when determine the possible delivery route. The determining of the delivery route (e.g. of the plurality of possible delivery routes) can be effected at least partially based on navigation map information kept by the route planning component.

The knowledge-based and self-learning vehicle configuration component 302 is, by way of example, configured for determining a possible vehicle configuration. For example, the knowledge-based and self-learning vehicle configuration component 302 is configured to perform step 1032 disclosed above in conjunction with FIG. 1b. The knowledge-based and self-learning vehicle configuration component 302 can further also be used for determining the expected energy requirement. For example, it may be configured to perform step 1033 disclosed above in conjunction with FIG. 1b.

The knowledge-based and self-learning vehicle configuration component 302 comprises an input and/or output module 3021, a query module 3022, a knowledge database 3023, a training module 3024 and a data collection module 3025. The knowledge database 3023 stores historical delivery information that has been captured and/or determined by the vehicles and obtained by the data collection module 3025, for example. The training module 3024 is used, by way of example, for training the knowledge database 3025 by virtue of its filtering the historical delivery information obtained by the data collection module 3025 such that the knowledge database 3023 is used to store only relevant historical delivery information. If historical delivery information is continuously obtained on the data collection module 3025, the knowledge database 3023 can be continuously trained by the training module 3024. For example, the training can be effected such that the knowledge database 3023 can be taken as a basis for determining a vehicle configuration for a vehicle for a particular delivery route such that it is expected that a vehicle having this vehicle configuration will move along this delivery route in as energy-efficient a manner as possible and/or that the expected energy requirement for the delivery of the shipments along this delivery route by a vehicle having this vehicle configuration will be as low as possible. The training module 3024 may be based on an algorithm for machine learning, for example. Machine learning can be effected, by way of example, in the form of supervised machine learning, unsupervised machine learning and/or reinforcement machine learning. Preferably, the machine learning is effected by means of a combination of several of these techniques.

Besides the historical delivery information, the knowledge database can also be used to store further information, such as, for example, environmental information (e.g. weather information and/or traffic information).

The input and/or output module 3021 can be used by the vehicle configuration component 302 to receive and/or send information. For example, the input and/or output module 3021 is used for interchanging information with the route planning component 301 and/or the route planning component 303. In this case, by way of example, it is possible to interchange information representing a possible delivery route determined by the route planning component 301 and/or a possible vehicle configuration determined by the vehicle configuration component 302 and/or an expected energy requirement determined by the simulation component 303.

The determining of a possible vehicle configuration can be effected by querying the knowledge database 3023 as appropriate, for example. The knowledge database 3023 is queried using the query module 3022, for example. The querying of the knowledge database 3023 is based, by way of example, at least partially on information received from the route planning component 301 that represents a possible delivery route determined by the route planning component 301, so that the result obtained for the query is a possible vehicle configuration for a vehicle for which is expected that a vehicle having this vehicle configuration will move along this delivery route in as energy-efficient a manner as possible and/or that the expected energy requirement for the delivery of the shipments along this delivery route by a vehicle having this vehicle configuration will be as low as possible.

Besides the vehicle configuration, the result obtained for the querying of the knowledge database may also be further information relevant to a simulation of the delivery of the shipments along the determined possible delivery route by a vehicle having the determined possible vehicle configuration, for example, such as environmental information (e.g. weather information and/or environmental information).

The simulation component 303 is, by way of example, configured for determining an expected energy requirement. For example, the simulation component 303 is configured to perform step 1033 disclosed above in conjunction with FIG. 1b. For example, the simulation component can perform a virtual simulation of the delivery of the shipments along the determined possible delivery route by a vehicle having the determined possible vehicle configuration, in order to determine the energy requirement expected for the delivery. For this purpose, the simulation component receives, by way of example, information representing the possible delivery route determined by the route planning component 301 and/or the possible vehicle configuration determined by the vehicle configuration component 302. It goes without saying that further information such as, for example, traffic information and/or environmental information can also be taken into consideration for the simulation. The result obtained for the simulation is the expected energy requirement, for example. It goes without saying that this expected energy requirement may differ from the actual energy requirement. Nevertheless, the simulation based on the delivery route and the vehicle configuration achieves a particularly good approximation of the expected energy requirement to the actual energy requirement. This approximation can be enhanced further by taking into consideration further information.

Subsequently, the simulation component 302 can determine whether a predetermined energy requirement condition is satisfied (cf. step 1034), for example, and decide whether the determined possible delivery route and the determined vehicle configuration are supposed to be determined as the delivery route and as the vehicle configuration for the delivery of the shipments (cf. step 1035).

Figure 4:
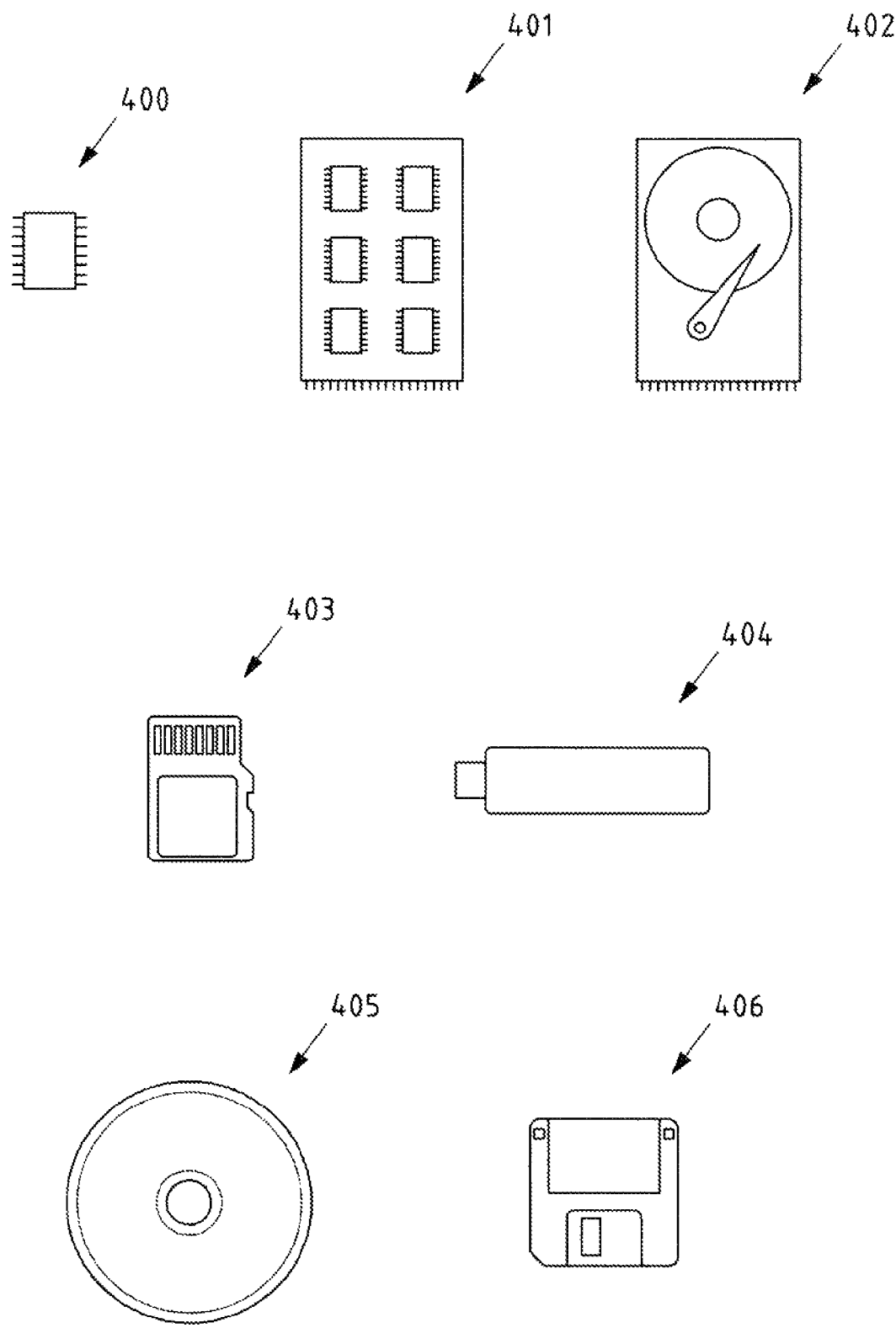
FIG. 4 shows exemplary embodiments of storage media.

Finally, FIG. 4 shows exemplary embodiments of storage media that may store an exemplary embodiment of a disclosed computer program. The storage medium may be a magnetic, electrical, optical and/or other kind of storage medium, for example. The storage medium may be, by way of example, part of a processor (e.g. the processor 201 of the apparatus 200 from FIG. 2), for example a (non-volatile or volatile) program memory of the processor or a portion thereof (e.g. program memory 202). Exemplary embodiments of a storage medium are a flash memory 400, an SSD hard disk 401, a magnetic hard disk 402, a memory card 403, a memory stick 404 (e.g. a USB stick), a CD-Rom or DVD 405 or a floppy disk 406.

The exemplary embodiments of the present invention that are described in this specification are also intended to be understood as disclosed in all combinations with one another. In particular, the description of a feature that an exemplary embodiment comprises is—unless explicitly explained to the contrary—also not intended to be understood, in the present case, to mean that the feature is indispensable or essential for the function of the exemplary embodiment. The sequence of the method steps outlined in this specification in the individual flowcharts is not imperative, and alternative sequences of the method steps are conceivable—unless indicated otherwise. The method steps can be implemented in different ways, and implementation in software (by virtue of program instructions), hardware or a combination of the two is conceivable for implementing the method steps.

Terms used in the patent claims such as "comprise", "have", "include", "contain" and the like do not exclude further elements or steps. The wording "at least partially" covers both the "partially" case and a "completely" case. The wording "and/or" is intended to be understood to mean that both the alternative and the combination are intended to be disclosed, that is to say that "A and/or B" means "(A) or (B) or (A and B)". A plurality of units, people or the like means multiple units, people or the like within the context of this specification. The use of the indefinite article does not exclude a plurality. A single device can perform the functions of multiple units or devices cited in the patent claims. Reference symbols specified in the patent claims are not intended to be regarded as restrictions for the means and steps employed.

The invention claimed is:

1. A method performed by an apparatus or a system, wherein the method comprises:
    obtaining or keeping historic delivery information, wherein the historic delivery information is associated with multiple deliveries of shipments performed by one or various vehicle(s), and wherein the historic delivery information for each of the deliveries of shipments associated with the delivery information represents at least an energy requirement and details pertaining to a delivery route, and details pertaining to a vehicle configuration;
    obtaining shipment delivery information for multiple shipments to be delivered, wherein the shipment delivery information at least for each of the shipments represents a detail pertaining to the delivery position for the delivery of the respective shipment;
    determining a delivery route for delivering the shipments and a vehicle configuration for a vehicle for delivering the shipments along the determined delivery route at least partially based on the shipment delivery information and the historical delivery information, wherein the determining of the delivery route and of the vehicle configuration comprises the following steps:
        determining a possible delivery route for delivering the shipments,
        determining a possible vehicle configuration of a vehicle for delivering the shipments along the possible delivery route,
        determining the expected energy requirement for the delivery of the shipments along the possible delivery route by a vehicle having the possible vehicle configuration;
    providing delivery control information in order to cause delivery of the shipments along the determined delivery route by a vehicle having the determined vehicle configuration.

2. The method according to claim 1, wherein the determining of the delivery route and of the vehicle configuration comprises:
    determining whether the expected energy requirement for the delivery of the shipments along the possible delivery route by a vehicle having the possible vehicle configuration satisfies a predetermined energy requirement condition, and wherein the possible delivery route is determined as a delivery route for delivering the shipments, and the possible vehicle configuration is determined as a vehicle configuration for a vehicle for delivering the shipments along the delivery route, only if it is determined that the predetermined energy requirement condition is satisfied, and
    wherein, if it is determined that the predetermined energy requirement condition is not satisfied, the steps for determining of the delivery route and of the vehicle configuration are iterated with a further possible delivery route and a further possible vehicle configuration.

3. The method according to claim 1, wherein if it is determined that the predetermined energy requirement condition is not satisfied, the determining of the delivery route and of the vehicle configuration comprises:
    determining at least one further possible delivery route for delivering the shipments;
    determining a further possible vehicle configuration of a vehicle for delivering the shipments along the further delivery route;
    determining the expected energy requirement for the delivery of the shipments along the further possible delivery route by a vehicle having the further possible vehicle configuration;
    determining whether the expected energy requirement for the delivery of the shipments along the further possible delivery route by a vehicle having the further possible vehicle configuration satisfies the predetermined energy requirement condition.

4. The method according to claim 1, wherein the determining of the delivery route and of the vehicle configuration comprises:
    selecting at least one of the determined delivery route from a plurality of possible delivery routes for delivering the shipments and the determined vehicle configuration from a plurality of possible vehicle configurations for a vehicle for delivering the shipments along the delivery route.

5. The method according to claim 4, wherein the expected energy requirement for the delivery of the shipments along the respective possible delivery route by a vehicle having the respective possible vehicle configuration is determined for each of the possible delivery routes and each of the possible vehicle configurations, and wherein the delivery route from the possible delivery routes and the vehicle configuration from the possible vehicle configurations having the lowest expected energy requirement is selected for the delivery of the shipments.

6. The method according to claim 1, wherein the determining of the delivery route and of the vehicle configuration is effected at least partially according to an evolutionary algorithm or an algorithm for machine learning.

7. The method according to claim 1, wherein the historical delivery information for each of the deliveries of shipments associated with the delivery information further represents at least one or more of the following details:
    a detail pertaining to at least one of a vehicle speed and vehicle acceleration on the delivery route or on a section of the delivery route for the delivery of shipments associated with the respective delivery information;
a detail pertaining to the nature of the delivery route or of a section of the delivery route for the delivery of shipments associated with the respective delivery information; and
a detail pertaining to the timing of the delivery of shipments associated with the respective delivery information.

8. The method according to claim 1, wherein the shipment delivery information for each of the shipments further represents at least one or more of the following details:
a detail pertaining to external dimensions of the respective shipment;
a detail pertaining to a weight of the respective shipment;
a detail pertaining to a delivery time or pertaining to a delivery period for the delivery of the respective shipment;
a detail pertaining to a nature of the delivery position for the delivery of the respective shipment; and
a detail pertaining to a recipient name or pertaining to a recipient address for the respective shipment.

9. The method according to claim 1, wherein the method further comprises:
obtaining or keeping environmental information associated with the delivery of the shipments, wherein the determining of at least one of the delivery route and of the vehicle configuration and of the expected energy requirement is further based at least partially on the environmental information.

10. The method according to claim 9, wherein the environmental information comprises weather information representing at least one detail pertaining to the expected weather or pertaining to the expected position of the sun at at least one delivery position from the delivery positions.

11. The method according to claim 1, wherein the method further comprises:
obtaining historical delivery information associated with the delivery of the shipment when the vehicle having the determined vehicle configuration has delivered the shipments along the determined delivery route, wherein the delivery information represents at least details pertaining to the determined delivery route, pertaining to the energy requirement and pertaining to the determined vehicle configuration.

12. An apparatus comprising at least one processor and at least one memory having program instructions, the at least one memory and the program instructions being configured so as, together with the at least one processor, to cause the apparatus to perform:
obtaining or keeping historic delivery information, wherein the historic delivery information is associated with multiple deliveries of shipments performed by one or various vehicle(s), and wherein the historic delivery information for each of the deliveries of shipments associated with the delivery information represents at least an energy requirement and details pertaining to a delivery route, and details pertaining to a vehicle configuration;
obtaining shipment delivery information for multiple shipments to be delivered, wherein the shipment delivery information at least for each of the shipments represents a detail pertaining to the delivery position for the delivery of the respective shipment;
determining a delivery route for delivering the shipments and a vehicle configuration for a vehicle for delivering the shipments along the determined delivery route at least partially based on the shipment delivery information and the historical delivery information, wherein the determining of the delivery route and of the vehicle configuration comprises the following steps:
determining a possible delivery route for delivering the shipments,
determining a possible vehicle configuration of a vehicle for delivering the shipments along the possible delivery route,
determining the expected energy requirement for the delivery of the shipments along the possible delivery route by a vehicle having the possible vehicle configuration;
providing delivery control information in order to cause delivery of the shipments along the determined delivery route by a vehicle having the determined vehicle configuration.

13. The apparatus according to claim 12, wherein the determining of the delivery route and of the vehicle configuration comprises:
determining whether the expected energy requirement for the delivery of the shipments along the possible delivery route by a vehicle having the possible vehicle configuration satisfies a predetermined energy requirement condition,
wherein the possible delivery route is determined as a delivery route for delivering the shipments, and the possible vehicle configuration is determined as a vehicle configuration for a vehicle for delivering the shipments along the delivery route, only if it is determined that the predetermined energy requirement condition is satisfied, and
wherein, if it is determined that the predetermined energy requirement condition is not satisfied, the steps for determining of the delivery route and of the vehicle configuration are iterated with a further possible delivery route and a further possible vehicle configuration.

14. The apparatus according to claim 12, wherein if it is determined that the predetermined energy requirement condition is not satisfied, the determining of the delivery route and of the vehicle configuration comprises:
determining at least one further possible delivery route for delivering the shipments;
determining a further possible vehicle configuration of a vehicle for delivering the shipments along the further delivery route;
determining the expected energy requirement for the delivery of the shipments along the further possible delivery route by a vehicle having the further possible vehicle configuration;
determining whether the expected energy requirement for the delivery of the shipments along the further possible delivery route by a vehicle having the further possible vehicle configuration satisfies the predetermined energy requirement condition.

15. The apparatus according to claim 12, wherein the determining of the delivery route and of the vehicle configuration comprises:
selecting at least one of the determined delivery route from a plurality of possible delivery routes for delivering the shipments and the determined vehicle configuration from a plurality of possible vehicle configurations for a vehicle for delivering the shipments along the delivery route.

16. The apparatus according to claim 15, wherein the expected energy requirement for the delivery of the shipments along the respective possible delivery route by a vehicle having the respective possible vehicle configuration is determined for each of the possible delivery routes and each of the possible vehicle configurations, and wherein the delivery route from the possible delivery routes and the vehicle configuration from the possible vehicle configurations having the lowest expected energy requirement is selected for the delivery of the shipments.

17. The apparatus according to claim 12, wherein the determining of the delivery route and of the vehicle configuration is effected at least partially according to an evolutionary algorithm or an algorithm for machine learning.

18. The apparatus according to claim 12, wherein the historical delivery information for each of the deliveries of shipments associated with the delivery information further represents at least one or more of the following details:
- a detail pertaining to at least one of a vehicle speed and vehicle acceleration on the delivery route or on a section of the delivery route for the delivery of shipments associated with the respective delivery information;
- a detail pertaining to the nature of the delivery route or of a section of the delivery route for the delivery of shipments associated with the respective delivery information; and
- a detail pertaining to the timing of the delivery of shipments associated with the respective delivery information.

19. The apparatus according to claim 12, wherein the shipment delivery information for each of the shipments further represents at least one or more of the following details:
- a detail pertaining to external dimensions of the respective shipment;
- a detail pertaining to a weight of the respective shipment;
- a detail pertaining to a delivery time or pertaining to a delivery period for the delivery of the respective shipment;
- a detail pertaining to a nature of the delivery position for the delivery of the respective shipment; and
- a detail pertaining to a recipient name or pertaining to a recipient address for the respective shipment.

20. The apparatus according to claim 12, wherein the he at least one memory and the program instructions are further configured so as, together with the at least one processor, to cause the apparatus to perform:
- obtaining or keeping environmental information associated with the delivery of the shipments, wherein the determining of at least one of the delivery route and of the vehicle configuration and of the expected energy requirement is further based at least partially on the environmental information.

21. The apparatus according to claim 12, wherein the he at least one memory and the program instructions are further configured so as, together with the at least one processor, to cause the apparatus to perform:
- obtaining historical delivery information associated with the delivery of the shipment when the vehicle having the determined vehicle configuration has delivered the shipments along the determined delivery route, wherein the delivery information represents at least details pertaining to the determined delivery route, pertaining to the energy requirement and pertaining to the determined vehicle configuration.

22. A non-transitory computer readable storage medium in which computer program code is stored, the computer program code when executed by a processor causing at least one apparatus to perform:
- obtaining or keeping historic delivery information, wherein the historic delivery information is associated with multiple deliveries of shipments performed by one or various vehicle(s), and wherein the historic delivery information for each of the deliveries of shipments associated with the delivery information represents at least an energy requirement and details pertaining to a delivery route, and details pertaining to a vehicle configuration;
- obtaining shipment delivery information for multiple shipments to be delivered, wherein the shipment delivery information at least for each of the shipments represents a detail pertaining to the delivery position for the delivery of the respective shipment;
- determining a delivery route for delivering the shipments and a vehicle configuration for a vehicle for delivering the shipments along the determined delivery route at least partially based on the shipment delivery information and the historical delivery information, wherein the determining of the delivery route and of the vehicle configuration comprises the following steps:
  - determining a possible delivery route for delivering the shipments,
  - determining a possible vehicle configuration of a vehicle for delivering the shipments along the possible delivery route,
  - determining the expected energy requirement for the delivery of the shipments along the possible delivery route by a vehicle having the possible vehicle configuration;
- providing delivery control information in order to cause delivery of the shipments along the determined delivery route by a vehicle having the determined vehicle configuration.

* * * * *